United States Patent [19]

Karnin et al.

[11] Patent Number: 5,434,933
[45] Date of Patent: Jul. 18, 1995

[54] IMAGE PROCESSING

[75] Inventors: Ehud Karnin, Koranit; Aviad Zlotnick, D.N. Lower Galil, both of Israel

[73] Assignee: International Business Machines Corporation, Armonk, N.Y.

[21] Appl. No.: 147,195

[22] Filed: Nov. 3, 1993

[30] Foreign Application Priority Data

Oct. 9, 1993 [EP] European Pat. Off. ........ 93116397.6

[51] Int. Cl.6 ............................................. G06K 9/46
[52] U.S. Cl. ................... 382/317; 358/467; 382/192
[58] Field of Search ............................ 382/18, 61, 14; 358/462, 467, 468

[56] References Cited

U.S. PATENT DOCUMENTS

| | | | |
|---|---|---|---|
| 4,853,968 | 8/1989 | Berkin | 382/14 |
| 5,224,180 | 6/1993 | Tadokoro | 382/61 |
| 5,247,591 | 9/1993 | Baran | 382/61 |
| 5,293,429 | 3/1994 | Pizano et al. | 382/61 |

Primary Examiner—Leo H. Boudreau
Attorney, Agent, or Firm—Gunn & Associates

[57] ABSTRACT

A system and method are disclosed for recognizing the type of an electronically stored image of a document. The method is composed of two parts: form signature computation, and signature matching. For form acquisition, signatures of forms are computed and stored in a template data base. For recognition, the signature of the input form is computed, and the best match between it and the signatures in the template data base is found. The input form is then considered to be the same as the form from which the best matching signature was computed.

8 Claims, 3 Drawing Sheets

PEAKS:

SCALE: 0.977, CORRELATION 31%, OCS BASED SCORE: 89%

IMAGE PROCESSING

FIELD OF THE INVENTION

This invention relates to improvements in and relating to methods and apparatus for processing certain document images stored in digital form.

DESCRIPTION OF RELATED ART

There are many important office applications where documents are preceded by a cover sheet form, or even the whole document is embedded in a form structure. It is a routine office procedure to sort the documents according to their type, which means that the type of the form has to be recognized.

It is equally important for electronic document handling apparatus to be able to automatically recognise the type of a digitally stored document so that the documents can be stored or processed accordingly.

For example FAX servers, which are devices used in conjunction with a computer to receive FAX messages from the phone line and electronically store them in the data processing system, would need to identify the type of cover sheet of the incoming facsimile. This is an essential phase, for example, in locating the addressee name, for automating routing of the FAX in the data processing system, over for instance a computer network, to the addressee.

Several previous approaches to electronic document type recognition are based on a special design of the form, especially for FAX cover sheets. It is usual to put on the forms special patterns that are easily recognizable by a data processing system. This approach involves the constraint for the sender to follow predetermined specifications in preparing the documents. In some applications, for example, a bar code is added to the form. This approach involves the drawback that form space is used for the marking, and sometimes it is a big portion of the form. Other drawbacks are that the aesthetics of the form design are compromised, and that only forms designed especially for computerized analysis are acceptable. Furthermore such a technology cannot be applied without difficulties to recognize forms that were generated outside the organization which uses it.

SUMMARY OF THE INVENTION

It is therefore an object of the present invention to overcome the above drawbacks of the prior art.

According to the present invention we provide a method for determining the type of an electronically stored image of a document, the image comprising a plurality of pixels which pixels may take one of a plurality of values, the method comprising the steps of: generating a one dimensional projection, based on a super linear function of the number of contiguous pixels having the same value along straight lines in the image in a predetermined direction; computing a signature for the image by detecting the position in the projection of a number of peaks; comparing said computed signature with a plurality of pre-stored master signatures, each master signature having a document type associated therewith, to determine the master signature which has the highest similarity with said computed signature, the type of the document being thereby determined to be the same as the document type associated with the master signature having the highest similarity.

Also, according to the present invention, we provide an image processing system for the determination of the type of electronically stored image of a document, the image comprising a plurality of pixels which pixels may take one of a plurality of values, the system comprising: logic for generating a one dimensional projection, based on a super linear function of the number of contiguous pixels having the same value along straight lines in the image in a predetermined direction; logic for computing a signature for the image by detecting the position in the projection of a number of peaks; logic for comparing said computed signature with a plurality of stored master signatures, each master signature having a document type associated therewith, to determine the master signature which has the highest similarity with said computed signature, the type of the document being thereby determined to be the same as the document type associated with the master signature having the highest similarity.

With the present invention the form is not changed, so it retains all the advantages of a regular form, and the party sending the form does not have to be computer literate.

Various preferred features of the inventions are set out in the attached dependent claims.

BRIEF DESCRIPTION OF THE DRAWINGS

The foregoing and other objects, features, and advantages of the invention will be apparent from the following more particular description of the preferred embodiment of the invention, as illustrated in the accompanying drawing, wherein.

DESCRIPTION OF THE PREFERRED EMBODIMENT

In the preferred embodiment the method is applied in the recognition of cover sheet forms in FAX transmission.

Figure 1:
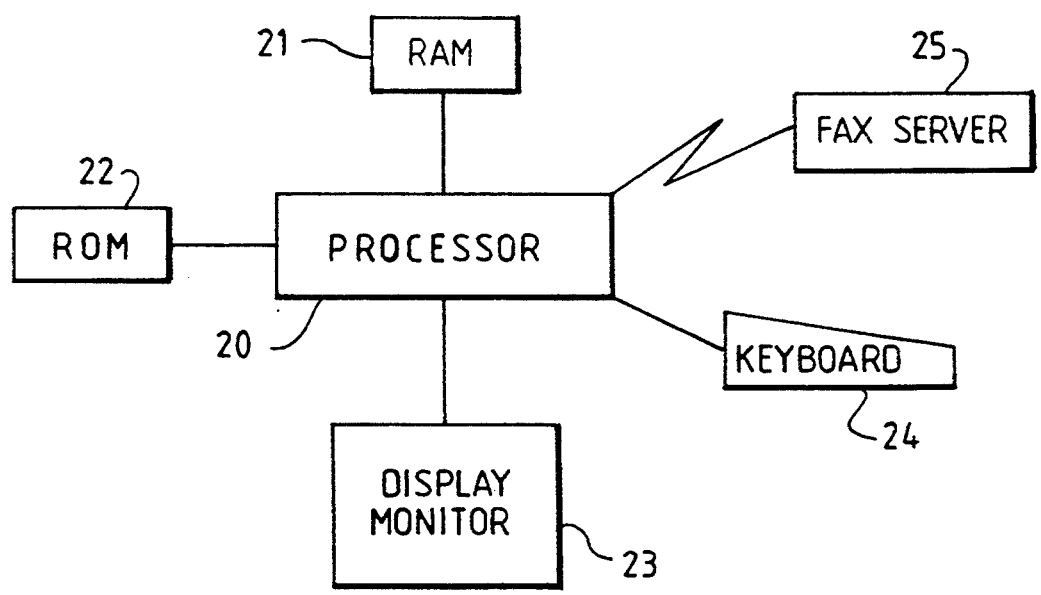
FIG. 1 is a schematic diagram of the system embodying the invention.

In FIG. 1 the data processing system which embodies the invention is illustrated. It includes a processor 20, a RAM memory 21, a ROM memory 22, a display monitor 23 and a keyboard 24. The FAX server 25 provides the system with the electronically stored image of the document to be analysed for the recognition. A FAX server is a device connected with the telephone line and it converts a document received as a telephone signal into the format required by the data processing system. The generated image signal can be bi-level, with 1 representing dark and 0 bright (or viceversa), or it can be multi-level, with 1 representing black, N representing white (or viceversa) and values between representing various shades of grey. The signal is assumed to be arranged in a rectangular array. However, this does not exclude the possibility that this signal is also compressed so as to minimize storage and communication time requirements.

Of course the invention operates equally well if the FAX server is substituted by any apparatus which provides the data processing system with the image of the document in an electronically stored format. Such an apparatus could be a scanner which transforms a document received by a usual FAX receiver into the electronically stored format. The feeding of the document can be done manually, by placing the document in the exact location where the image is captured, or automatically by placing this document in a place where a mechanical device will move it to where the image is captured. Scanning can be done in several ways: the document can be moved across a narrow area of the image capture device, in which intensities in the document are translated to numbers representing grey scale, or this narrow area of the image capture device can be moved along the document, or an image capture device that captures the whole image at once can be used.

The method, according to the preferred embodiment of the present invention, is composed of two parts: form signature computation, and signature matching. For form acquisition, signatures of forms are computed and stored in a template data base. For recognition, the signature of the input form is computed, and the best match between it and the signatures in the template data base is found. The input form is then considered to be the same as the form from which the best matching signature was computed.

Figure 2:
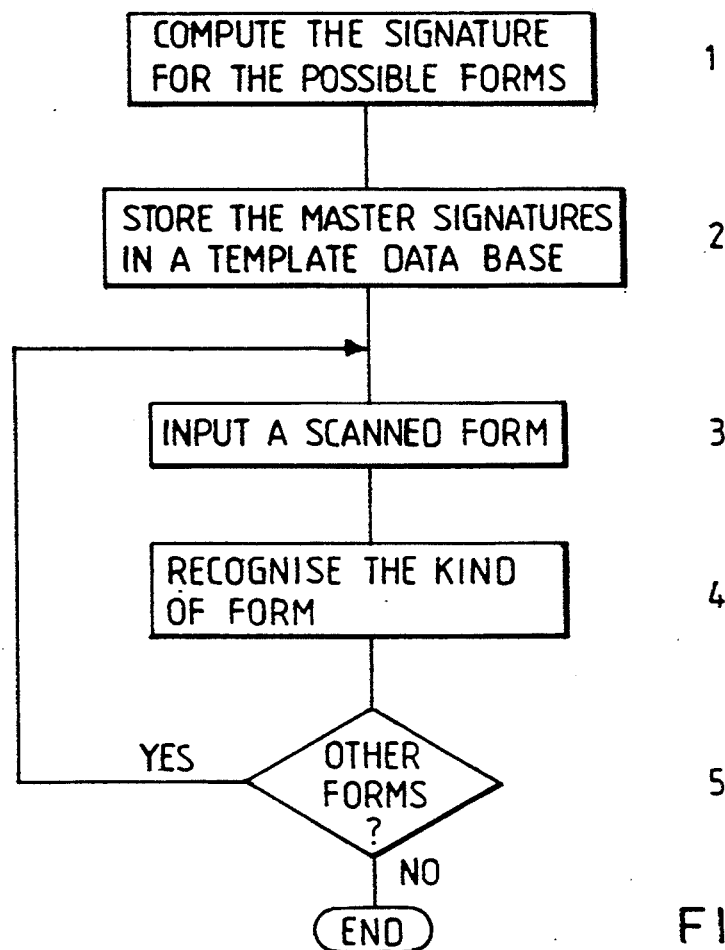
FIGS. 2 and 3 are schematic diagrams illustrating the steps of the preferred embodiment.

In FIG. 2 the whole process is shown. First of all, for every kind of form which is expected to be received, a "signature" is computed 1. A "signature" according to the preferred embodiment, is a numeric representation of the form and it is computed using the method described below. All the "master" signatures so computed are stored in a template data base 2. When an electronically stored image of a form is received 3, it is recognized 4 as detailed in FIG. 2 and the process is repeated for every form received 5.

Figure 3:
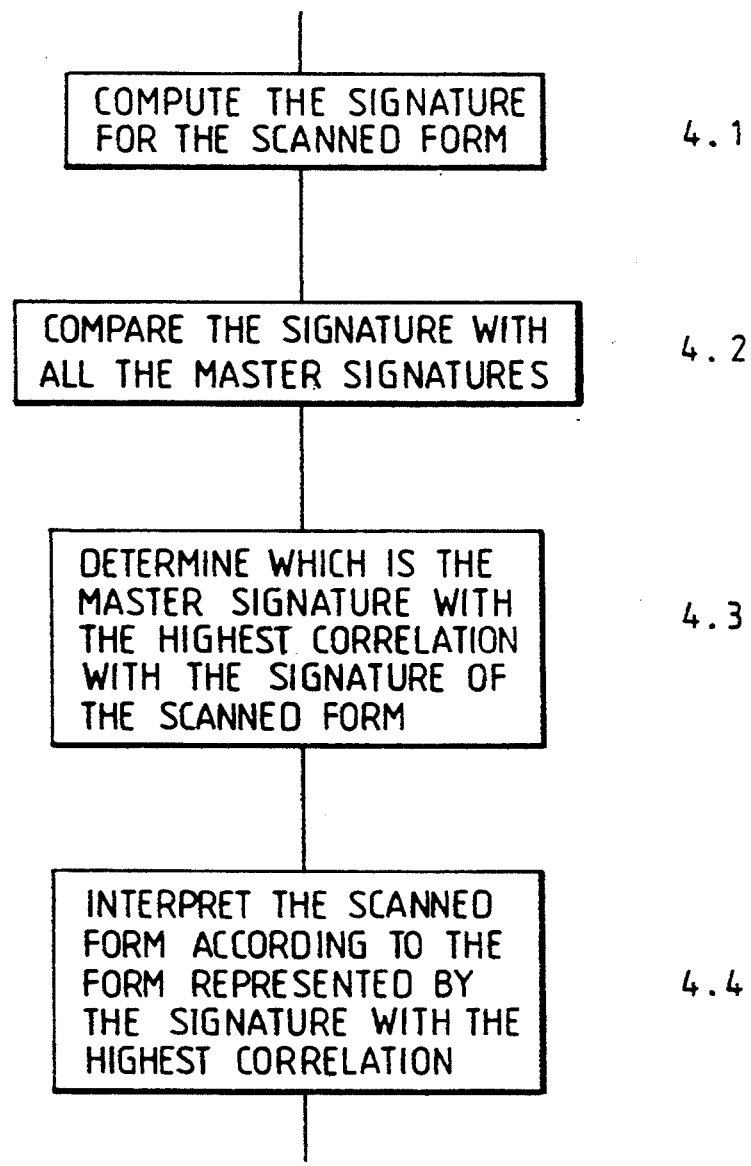

Referring to FIG. 3 the step of recognizing the received form is detailed in its composing steps. The signature of the form is derived 4.1 using the same method as step 1. The signature so computed is compared with the master signatures stored in the template data base 4.2 as described in more detail below. For each master signature a score is determined according to its similarity with the signature of the received form; the master signature with the highest score is considered to be the most representative of the received form 4.3. The received form is thus considered to be of the same type of the form from which the master signature with the highest score was derived 4.4.

Bi-level image data arrives in various formats (such as IOCA, MO:DCA, RFT), and using various compression schemes (such as G3, G4, MMR). All these compression schemes are based on run-end encoding, which is particularly suitable to the processing steps of the preferred embodiment of the present invention, though the invention is not limited to the use of such encoding. The cited formats and compression schemes will be well understood by those skilled in the art.

The generation of the image signatures will now be described.

First, the image data is projected horizontally on the vertical axis, with an emphasis on long runs. The emphasis on long runs can be achieved using any super-linear function of the run length. In the preferred embodiment this emphasis is achieved by squaring the lengths of black runs, i.e., for each image row we compute the projection as:

$$\sum_{i=0}^{num\_runs} (runend_i - runstart_i)^2$$

Next, the peaks of this projection are successively located. The vertical location and the size of the N highest peaks is the form signature. N may be a constant (e.g. the 17 highest peaks), or preferably may be determined dynamically as a function of all the projection peak heights.

As mentioned above, it is possible to select a fixed number of peaks per signature. However, in some cases such a policy is insufficient. One of these is when some forms have many equal size lines, that result in equal sized peaks. If the number of these peaks is more than the fixed number of peaks per signature, and especially if some noise is present, then the computed signature is a random selection of some of these peaks, and matching results are likely to be poor. It is therefore beneficial to base the number of peaks on the distribution of peak lengths.

In one embodiment a two step heuristic procedure to find the minimum peak size is used. In the first step the peak sizes are sorted in descending order, and a race is held: the minimum peak size starts from 0 and grows so that large peaks increase the growth speed, but the number of peaks decreases it geometrically. The race stops when the remaining peaks are all smaller than the computed minimum size. An example (written in the C programming language) of such a procedure is shown below.

```
minimum_selected_peak_size = 0;
denom = 3;
for (i=0; i<number_of_peak_candidates; ++i)
    if (peak_candidate(i) < minimum_selected_peak_size)
        break;
    else
        minimum_selected_peak_size +=
            peak_candidate(i)/denom;
        denom = MIN(1000, denom*3);
```

The second step discards all the peaks that are less than half the average size of the peaks accepted by the first step.

In the preferred embodiment used by the inventors a simpler and more effective peak selection scheme is used as follows:
1. Peaks are ordered by descending size;
2. A peak size threshold size(i) is determined as the peak size for the smallest i such that size(i+1)<size(i)*{(i−1)/i}
3. All peaks whose size is not less than the threshold are selected.

In matching form signatures an important consideration is that the input form to be recognized is unlikely to be identical to the form that was acquired for the template data base. First, the contents of the form, i.e. the filled in text, is expected to be different. Second, geometric transformations such as shift, rotation (for small angles), and scale may be present. Last, but not least, noise may change the computed signatures by breaking long lines, and thus eliminating projection peaks, or by changing the distribution of projection peak sizes and changing the number of peaks in the signature. It is also quite common that a shadow created during the scanning of an image is represented as a long line in the image, and appears as one of the largest peaks in the signature.

Due to all the above, a function that is tolerant of missing and extra peaks is preferred. The OCS (Optimal Correspondence Subsequence) algorithm, as described in the article of Y. P. Wang and T. Pavlidis "Optimal Correspondence of String Subsequences" (IEEE trans. on PADI, 12 pp. 1080-1087, 1990), is appropriate for this application.

Given two sequences of elements $A=a_0, \ldots, a_n$, and $B=b_0, \ldots, b_m$, and a function $f(j,k,a,b)$, such that $f(j,k,a,b)$ is greater than or equal to 0 for all numeric arguments that evaluates the quality of the match between elements a and b, the OCS is a set of l index pairs $$C=j_0 k_0, \ldots, j_{l-1} k_{l-1}$$

such that
1) $0 \leq j_0 < j_1 < \ldots < j_{l-1} \leq N$
2) $0 \leq k_0 < k_1 < \ldots < k_{l-1} \leq M$ and 3) $\sum_{i=0}^{l-1} f(j_i, k_i, a_{j_i}, b_{k_i})$ is maximal The output of the algorithm is that maximal sum, and the sequence of index pairs.

The following is description of the OCS algorithm used in the embodiment of the invention:

Steps 1 to 4 calculate a matrix S in which $S(i,j)$ is the score of the OCS problem with $A=\{a_0, \ldots, a_i\}$, and $B=\{b_0, \ldots, b_j\}$.

```
1)  S(0,0) = f(a₀,b₀)
2)  for i=1 to N-1,
        S(i,0) = MAX{S(i-1,0), f(i,0,aᵢ,b₀)}
3)  for j=1 to M-1
        S(0,j) = MAX{S(0,j-1), f(0,j,a₀,bⱼ)}
4)  for i=1 to N-1
        for j=1 to M-1
        S(i,j) = MAX{S(i-1,j), S(i,j-1),
              S(i-1,j-1)+f(i,j,aᵢ,bⱼ)}
```

Steps 5 to 9 calculate P, the sequence of index pairs:

```
5)  i = N-1, j = M-1
6)  while i ≧ 0 and j ≧ 0
7)       if i > 0 and S(i-1,j) = S(i,j) then i = i-1
         else
8)       if j > 0 and S(i,j-1) = S(i,j) then j = j-1
         else
9)       if s(i,j) > 0
             insert <i,j> at the beginning of P
             i = i-1
             i = j-1
```

$S(N-1, M-1)$ is the return value of the algorithm, and P has the required indices.

The OCS algorithm can be speeded up by:

1) Not evaluating the parts of S where $i > j + \text{max\_diff}$ or $j > i + \text{max\_diff}$, where max_diff is an application dependent parameter;

2) Not evaluating the rest of row i if $S(i,j)$ is sufficiently large with respect to the maximal value in the row i-1;

3) Not evaluating the rest of column j if $S(i,j)$ is sufficiently large with respect to the maximal value in column j-1.

The formulation of the problem here is somewhat different than standard, in that the function $f()$ takes the indices as arguments in addition to the sequence values. This permits some flexibility in controlling unwanted matches.

For form matching we take a and b to be the peak locations in two signatures to be compared. The OCS algorithm thus selects matching peak pairs in the two signatures which give an optimal match with respect to the function f.

Two passes of OCS matching are performed. In the first, the objective is to calculate the best shift and scale transformation between the two signatures. In the second pass one signature is corrected by the shift and scale transformation computed in the first pass, and the OCS with respect to absolute row locations is found.

In the first pass, for finding shift and scale, $f(x,y)$ compares local neighborhoods of the signature peaks, by computing an OCS of distances of neighboring peaks from the neighborhood center in each of the two signatures. This is achieved by generating for each peak a sequence of difference values $\{a_i - a_k\}$ for all k and $\{b_j - b_l\}$ for all l and then using a recursive application of the OCS algorithm with the function f for each peak pair (i, j) being the above OCS sum for an optimal match between the respective sequences of difference values using the simple matching function: if $\{abs(x-y)\}$ is less than 10% of $\{Max(abs(x), abs(y))\}$ then $f(x,y)=1$, otherwise $f(x,y)=0$.

As a result of this pass one gets a list of corresponding signature peaks. Many, but frequently not all, of these correspondences are correct. These correspondances are used to find a best linear transformation between the row locations in the signatures of these peaks using a suitable line fitting procedure, such as the method described in "A non-parametric method for fitting a straight line to a noisy image" of Behzad Kamgar-Parsi and Behrooz Kamgar-Parsi (Center for Automation Research Tech. Report, CAR-TR-315, Sept. 1987).

One of the signatures to be compared is transformed using the shift and scale parameters found in this way and then the second OCS pass is performed to provide a more precise correspondance.

In the second pass, for absolute location matching, $f(x,y)$ returns a value that decreases when the distance between the row locations of the peaks increases. The function used in the preferred embodiment is:

$$f(x,y) = \cos(\min(10, |x-y|)/(20\pi)$$

This cosine function gives a maximal weight to peaks in the same location, and a zero weight to peaks whose location difference is 10 or more. In between, the weight changes slowly near 0 and near 10, but quickly in the middle of this range.

The final OCS match score computed is the minimum of the percentage of peaks in each signature that have a match in the other signature. For instance, if one signature has 20 peaks and the other 25, and 10 peaks are matched, the match score is 40%.

Figure 4A:
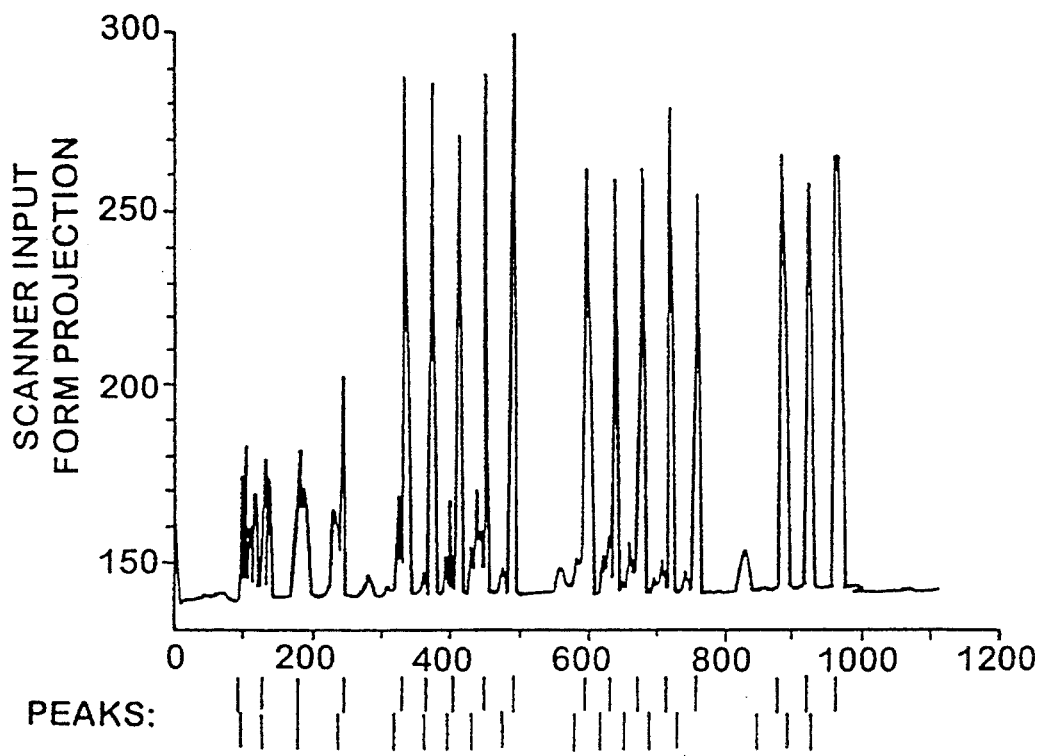
FIG. 4 is an example of the graphic representation for the recognition of the form.
Figure 4B:
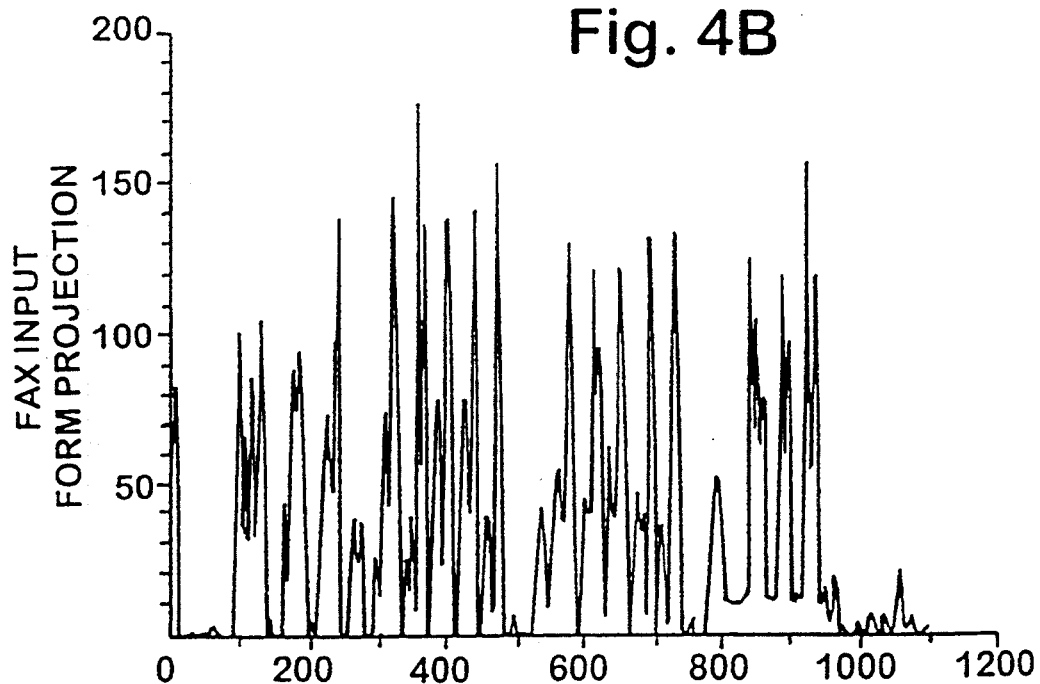

FIG. 4 illustrates this matching process. The same form was scanned in two different machines: One was a flat bed scanner, and the form was straight. The other was a FAX machine, and the form was considerably rotated. The vertical resolution of the scanner is 200 DPI, while the FAX has 196 DPI. FIG. 4 shows the vertical projections of the two signatures, and the dominant peak locations. As can be seen, the scale difference causes a gradual drift in peak alignments, so that on the left the corresponding peaks are aligned, whereas on the right there is a shift of one peak. This shift of one peak results in a very good match between peaks that do not correspond to the same image feature.

If, however, one looks at small neighborhoods around each peak, e.g. two peaks to each side, the picture is different: in terms of location, the sixth peak from the left in the scanner input may match either the sixth or seventh peak in the FAX input. But the sixth peak in both signatures has one neighbor far to the left, whereas the seventh has two relatively near ones. So the first pass of OCS will actually find the correct peak pairing, and compute the correct scale. As a result, although straightforward correlation of the two projections is very low, around 30%, the score computed by the two phase OCS algorithm is almost 90%.

In the preferred embodiment of the invention each signature is also represented as a binary bit map and a rough comparison of the bit maps using an XOR function is used to determine the order in which template signatures are compared with an image signature. This provides significant improvements to the program speed, especially when the set of templates is large.

The following is a detailed description of the overall operation of the form recognition program:

I. Form Definition

1) Read an image (for example from a FAX card), and preprocess it:
   a) Convert to run-end format
   b) Remove black borders
2) Calculate the image signature as described above.
3) Represent the form signature as a character string.
4) Add the above string to the list of template signatures.

II. Form Recognition

1) Read a list of template signatures
2) Construct a list of bitmap representations of signatures. In the preferred embodiment this is achieved as follows:

For every signature, scaling the peaks' vertical locations by each scale from 0.9 to 1.1 in increments of 0.02, do the following:
   a) Find an offset between 0 and 32 inclusive, so that the sum of (8−ABS(16−(peak(i)+offset) modulo 33)) for all the peaks is maximised. Where peak (i) is the position of the ith peak.
   b) Add the offset to all the peaks' vertical locations.

The purpose of steps (a) and (b) is to make the bit map representation more stable with respect to small shifts. This is done by finding a shift that brings a good number of the peaks into the middle of the regions that are mapped to each bit.
   c) Clear a 32 bit integer (all 0's).
   d) In the above integer, set to 1 the bit in every location x, where x=peak_vertical_location/33 for every peak location. This results in a series of 11 signature bit maps for each template signature.
3) Read an image, and preprocess it:
   a) Convert to run-end format
   b) Remove black borders
4) Calculate the image signature as for the templates.
5) Match the image signature to the template signatures as follows:
   a) Calculate the bitmap representation of the image signature, as in (2) above but for a single scale.
   b) Compare the bitmap representation to all the bitmap representations of the template list, by XORing them and counting the non-zero bits.
   c) Order the templates by the quality of the bitmap match, in ascending count order, i.e. in descending order of match quality.
   d) Perform OCS based matching (as explained above) between the input image and the templates, in the order defined in (c), stopping when the non-zero bit count is relatively higher than the best OCS bit score achieved calculated as described below, i.e. if there are 10 peaks, and an OCS score of 90%, and a bit count of 4, there is no need to continue, since the bit count of 4 means that 4 peaks do not match well.

The calculation performed to normalize the bit score to the OCS scale is:

---

Bit_score
= Min (obs_n_peaks, ref_n_peaks) − ocs_n_matches + 2 *
(1 −ocs_score)
* ABS (obs_n_peaks - ref_n_peaks)

--- where:
   obs_n_peaks=the number of peaks found in the observed image.
   ref_n_peaks=the number of peaks found in the template image.
   ocs_n_matches=the number of peaks matched by OCS
   ocs_score=the match quality found by OCS normalised to lie between 0 and 1.
6) Calculate the geometric transformation between the input image and the template.
7) If the best match is not good enough confidence below a certain threshold), straighten the image and try again.
8) Optional: If the image is still not recognized, display it to an operator, and they can define it as a new template.
8) Output the best results in any suitable format.

The present invention has been described for the recognition of cover sheet forms in FAX transmission, but it could equally well be practiced in other applications where a recognition of an electronically stored image of a document is needed. Furthermore the methods of the preferred embodiement can be partially modified or substituted without departing from the scope of the invention. For example, in signature matching procedure, the number of peaks in a signature can be determined by other heuristics as well, and one can even construct a system that uses several heuristics concurrently. Results of matching with different criteria can be crossed, to achieve a higher confidence in the final result. Also it is beneficial to perform some peak selection before signature matching: given two signatures with M and N peaks, one may select only the largest min(M,N) peaks from each signature before matching. It is also possible to perform peak selection based on peak size: given two signatures whose minimum peak size is M and N respectively, one may select from each signature only those peaks whose size is at least max(M,N). Fast match rejects can be used before OCS to speed up recognition. For instance, it is possible to reject a match between two signatures which differ greatly in the number of peaks.

The above described use of a bitmap representation to determine the order the signatures in which template signatures are compared with the image signature has application to other fields where it is necessary to compare a sequence of features with a database of similar sequences of features to determine the best match. For example when looking up a word in a dictionary of stored words it is possible to represent the words as bitmaps using the character values (e.g. in ASCII coding). The order in which the dictionary words are compared with a trial word can be determined on the basis of a XOR comparison of the bitmaps, the words being compared until a suitable stopping criterion is satisfied. This greatly improves the matching speed. The technique can also be applied to speech recognition where the features are recorded syllables, to signature verification or character recognition.

We claim:

1. A method for determining the type of an electronically stored image of a document, the image comprising a plurality of pixels which pixels may take one of a plurality of values, the method comprising the steps of:
   projecting image data from said document horizontally on a vertical axis based on a super linear function where the sum of squares of lengths of sequences of the number of contiguous pixels having the same value are determined along straight lines in the image data in a predetermined direction;
   computing a signature for the image data by detecting the position of N highest peaks within said image data;
   comparing said computed signature with a plurality of pre-stored master signatures, each master signature having a document type associated therewith, to determine the master signature which had the highest similarity with said computed signature, the type of the document being thereby determined to be the same as the document type associated with the master signature having the highest similarity.

2. A method as in claim 1 wherein the number of the peaks is determined as a function of the distribution of peak lengths.

3. Image processing system for the determination of the type of electronically stored image of a document, the image comprising a plurality of pixels which pixels may take one of a plurality of values, the system comprising:
   logic for projecting image data from said document horizontally on a vertical axis based on a super linear function where the sum of squares of lengths of sequences of the number of contiguous pixels having the same value are determined along straight lines in the image data in a predetermined direction;
   logic for computing a signature for the image data by detecting the position of N highest peaks within said image data;
   logic for comparing said computed signature with a plurality of stored master signatures, each master signature having a document type associated therewith, to determine the master signature which has the highest similarity with said computed signature, the type of the document being thereby determined to be the same as the document type associated with the master signature having the highest similarity.

4. Fax processing system for determining the type of a FAX cover sheet, the system comprising an image processing system as claimed in claim 3 and a FAX receiver, the FAX receiver being connected with the image processing system.

5. A method as in claim 1 wherein the determination of the master signature which has the highest similarity with said computed signature, comprises for each comparison the use of an optimal correspondence subsequence (OCS) algorithm, the optimal correspondence subsequence being a set of index pairs $$C = i_0 j_0, \ldots, i_k j_k \text{ such that } SUM^k S=0 \, f(a,b)$$

is maximal, f(x,y) being a matching function evaluating the quality of the match between elements x and y, $A = a_0, \ldots, a_n$ and $B = b_0, \ldots, b_m$ being two signatures to be compared.

6. A method as in claim 5, wherein said matching function is $f(x,y) = \cos(\min(10, |x-y|)/(20 \times Pi))$.

7. A method as in claim 5 comprising determining parameters of a shift and scale transformation between the two signatures to be compared by using the OCS algorithm in which f(x,y) is the OCS sum for an optimal match between the separations of the signature peaks, and transforming one of the signatures using the determined parameters prior to the comparison.

8. A method as in claim 1 comprising generating bit map representations of the image signature and the prestored master signatures, the bit map representation comprising a sequence of binary values, the position in the sequence of each of which represents a position in the projection, the representation taking a first value if a peak is present at the position in the projection and a second value if no peak is present, wherein said computed signatures are compared with the master signatures in ascending order of the number of positions in the bit map representation in which the bitmap representation of the image signature has the same value as the bitmap representation of the master signature until a stopping criterion is satisfied.

* * * * *